US010095291B2

(12) United States Patent
Yanagawa

(10) Patent No.: US 10,095,291 B2
(45) Date of Patent: Oct. 9, 2018

(54) INFORMATION PROCESSING APPARATUS

(71) Applicant: CANON KABUSHIKI KAISHA, Tokyo (JP)

(72) Inventor: Katsuhiko Yanagawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 15/246,298

(22) Filed: Aug. 24, 2016

(65) Prior Publication Data

US 2017/0060215 A1   Mar. 2, 2017

(30) Foreign Application Priority Data

Aug. 31, 2015  (JP) .................................. 2015-171338

(51) Int. Cl.
*G06F 1/26* (2006.01)
*G06F 1/28* (2006.01)
*G06F 1/32* (2006.01)

(52) U.S. Cl.
CPC ................ *G06F 1/263* (2013.01); *G06F 1/28* (2013.01); *G06F 1/3206* (2013.01); *G06F 1/3284* (2013.01)

(58) Field of Classification Search
CPC .......... G06F 1/263; G06F 1/28; G06F 1/3206; G06F 1/3284
See application file for complete search history.

(56) References Cited

U.S. PATENT DOCUMENTS

| 6,098,175 | A | * | 8/2000 | Lee | ............................ | G06F 1/26 |
| | | | | | | 307/80 |
| 8,832,482 | B2 | * | 9/2014 | Hayashi | ................ | G06F 1/3284 |
| | | | | | | 358/1.15 |
| 9,325,172 | B2 | * | 4/2016 | Okuzono | ................ | H02J 3/005 |
| 9,356,637 | B2 | * | 5/2016 | Taya | .......................... | H02J 1/10 |

FOREIGN PATENT DOCUMENTS

JP         4-109457 A     4/1992

* cited by examiner

*Primary Examiner* — Stefan Stoynov
(74) *Attorney, Agent, or Firm* — Canon U.S.A., Inc. IP Division

(57) ABSTRACT

An information processing apparatus includes a first power supply unit, a first device and a second device to which power is supplied from the first power supply unit, a second power supply unit, a third device to which power is supplied from each of the first power supply unit and the second power supply unit, and a power control unit configured to perform control to switch a power supply source for the third device from the first power supply unit to the second power supply unit, and then to cause power to be supplied from the first power supply unit to the second device.

20 Claims, 5 Drawing Sheets

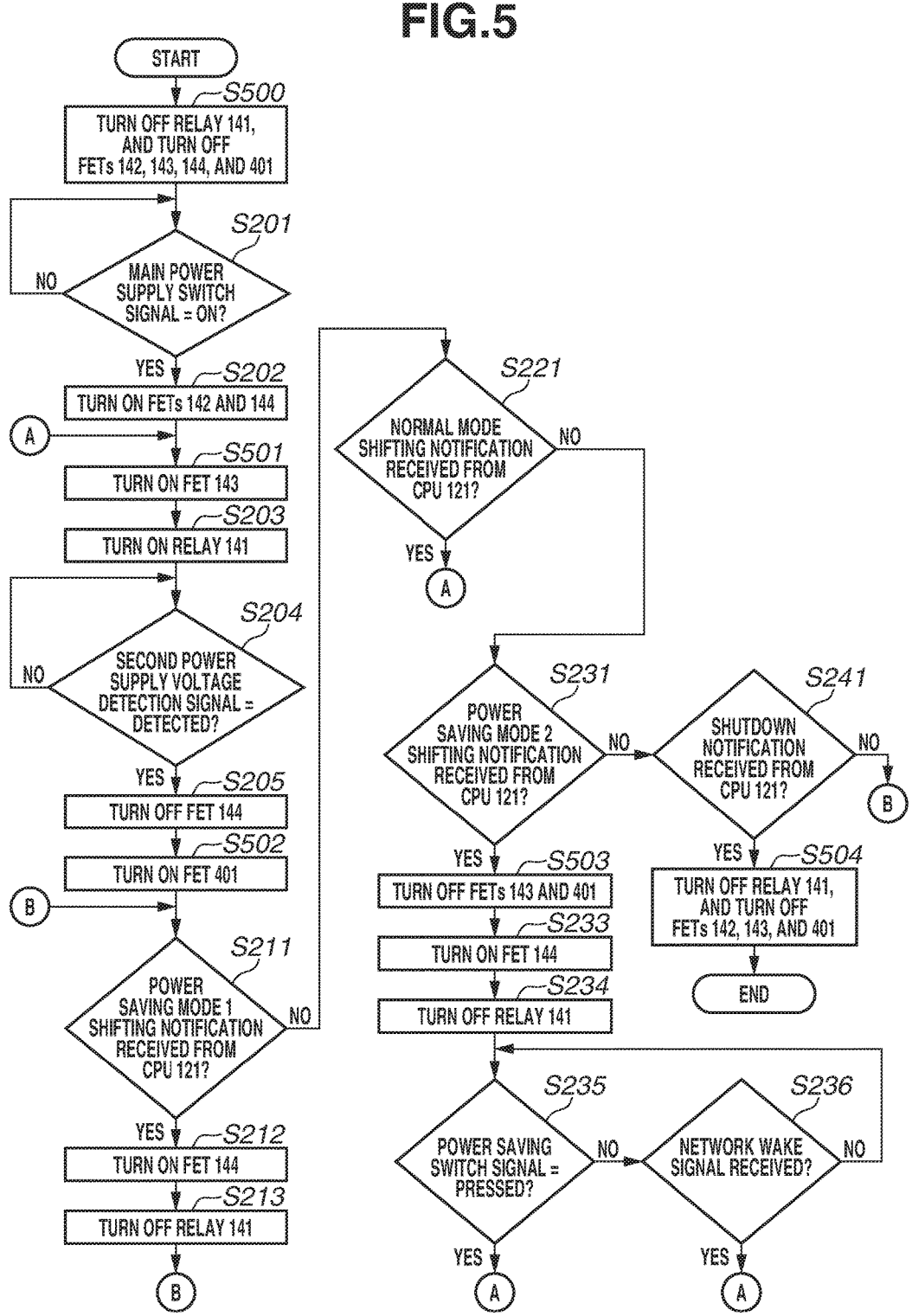

INFORMATION PROCESSING APPARATUS

BACKGROUND OF THE INVENTION

Field of the Invention

Aspects of the present invention generally relate to power supply control over an information processing apparatus.

Description of the Related Art

Recent information processing apparatuses have a great number of functional units mounted thereon, such as units for wired and wireless network functions, a plurality of storage functions, and a graphic accelerator function. Allowing such a great number of functional units to operate would increase power consumption. Therefore, information processing apparatuses would have a power supply unit with such a large rated output capacity as to be able to cope with large power consumption. Furthermore, it is generally known that a power supply unit would increase in size and become expensive as the rated output capacity thereof is made larger.

Japanese Patent Application Laid-Open No. 4-109457 discusses a technique to sequentially activate a plurality of functional units (including, for example, a disk drive) at intervals of a predetermined time, without simultaneously activating the plurality of functional units, for the purpose of lowering power consumption.

However, the time required from when a certain functional unit (a disk drive) starts to be activated until when the power consumption lowers after the passage of the time of high power consumption varies widely depending on functional units. Therefore, to prevent times of high power consumption of a plurality of functional units from overlapping each other, a next functional unit is started to activate after the lapse of a somewhat long time. As a result, the time required until an information processing apparatus is completely started up may disadvantageously become longer.

Taking a 3.5-inch hard disk drive as an example of a functional unit, since the time during which the power consumption thereof is high is several seconds to a dozen of seconds, a next functional unit is started to activate after the lapse of about 20 seconds. Therefore, the time required until an information processing apparatus is completely started up may become longer. This issue is not limited to activation of a hard disk drive, but a similar issue also occurs in activation of various functional units.

SUMMARY OF THE INVENTION

According to an aspect of the present invention, an information processing apparatus includes a first power supply unit, a first device and a second device to which power is supplied from the first power supply unit, a second power supply unit, a third device to which power is supplied from each of the first power supply unit and the second power supply unit, and a power control unit configured to perform control to switch a power supply source for the third device from the first power supply unit to the second power supply unit, and then to cause power to be supplied from the first power supply unit to the second device.

Further features of the present invention will become apparent from the following description of exemplary embodiments with reference to the attached drawings.

BRIEF DESCRIPTION OF THE DRAWINGS

FIG. 5 is a flowchart illustrating an example of an operation of a power supply control unit in the second exemplary embodiment.

DESCRIPTION OF THE EMBODIMENTS

Various exemplary embodiments, features, and aspects of the invention will be described in detail below with reference to the drawings. Furthermore, the following exemplary embodiments are described using an image forming apparatus, such as a printer or a multifunction peripheral, as an example.

Figure 1:
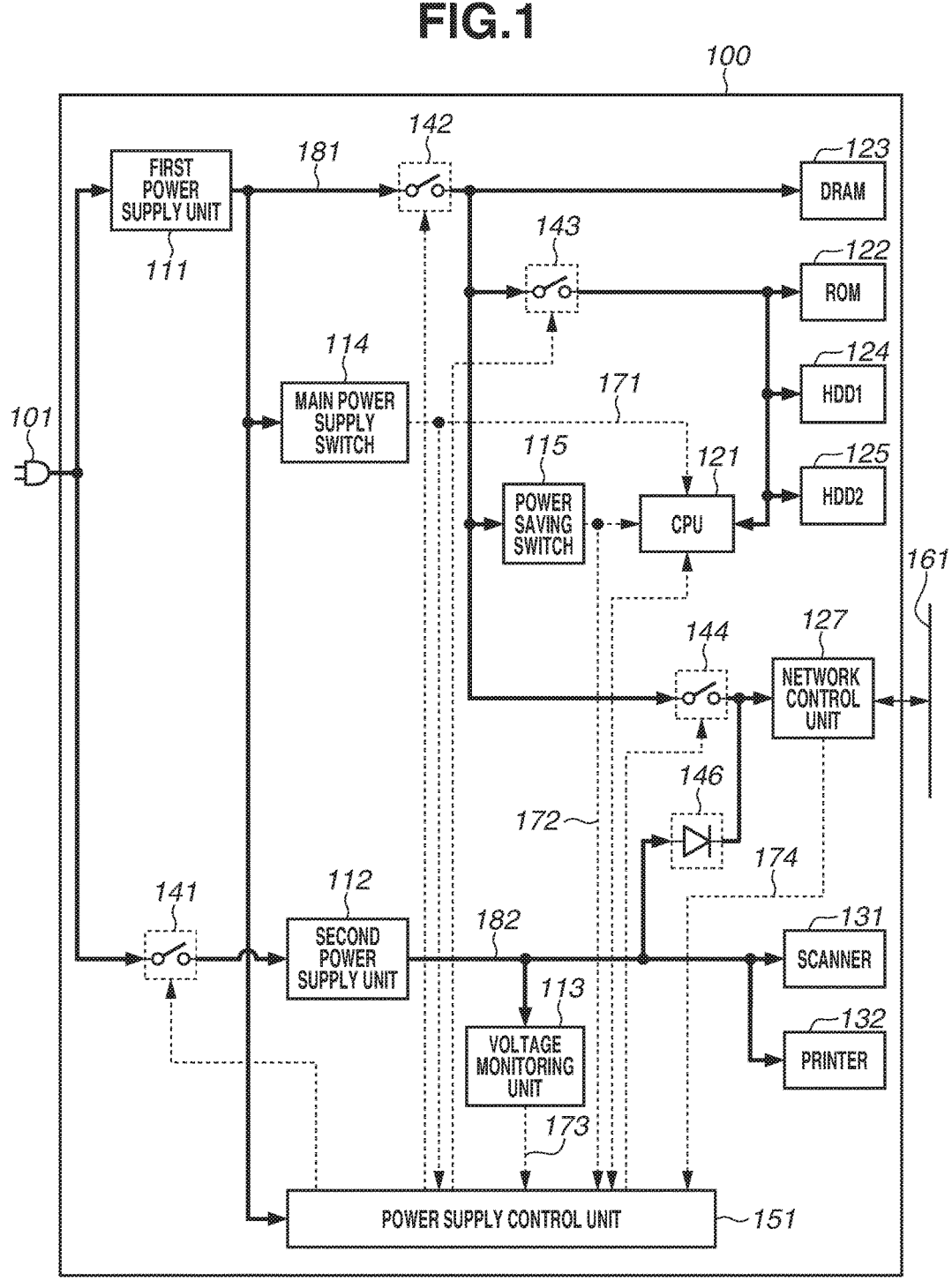
FIG. 1 is a hardware configuration diagram of an image forming apparatus to which an information processing apparatus is applicable according to a first exemplary embodiment.

FIG. 1 is a block diagram illustrating an example of a hardware configuration of an image forming apparatus 100 to which an information processing apparatus according to a first exemplary embodiment of the present invention is applicable. In FIG. 1, thick lines indicate power supply lines, and dashed lines indicate signal lines. Moreover, although there are actually connected signal lines other than those described herein, signal lines other than those required for description are not illustrated in FIG. 1.

Referring to FIG. 1, a power plug 101, which is configured to connect to a commercial power supply, receives alternating current (AC) when connecting to the commercial power supply. A first power supply unit 111, which converts AC into direct current (DC), outputs first DC power 181. A second power supply unit 112, which converts AC into DC, outputs second DC power 182. Furthermore, the first power supply unit 111 has such characteristics that the conversion efficiency for converting AC into DC is high and the rated capacity for outputting power is small as compared with those of the second power supply unit 112.

The image forming apparatus 100 includes two-stage power saving modes to lower standby power consumption. First, the first power saving mode (hereinafter referred to as "power saving mode 1") turns off the second power supply unit 112 to lower power consumption. Moreover, the second power saving mode (hereinafter referred to as "power saving mode 2"), in addition to turning off the second power supply unit 112, supplies power from the first power supply unit 111, which is high in AC-DC conversion efficiency, only to a portion required to be powered, so as to further lower power consumption than the power saving mode 1.

A voltage monitoring unit 113 monitors the output voltage of the second power supply unit 112, and, when detecting an intended voltage, outputs a second power supply voltage detection signal 173. A main power supply switch 114 switches between turning-on and turning-off of the image forming apparatus 100 in response to a user operation. The main power supply switch 114 is composed of a rocker switch, which can switch between two states of turning-on and turning-off. Moreover, the main power supply switch 114 outputs a main power supply switch signal 171 indicating whether the switch 114 is in an on-state or in an off-state.

A power saving switch 115 generates a trigger signal, in response to a user operation, to cause the image forming apparatus 100 to shift to the power saving mode 1 or the power saving mode 2 (in other words, a power saving state)

or to return from the power saving mode 1 or the power saving mode 2 (in other words, a power saving state). The power saving switch 115 is composed of a push switch, which can be pressed to connect contacts thereof to each other. The power saving switch 115 outputs a power saving switch signal 172 indicating whether the power saving switch 115 is in a pressed state.

A central processing unit (CPU) 121 controls the entirety of the image forming apparatus 100. A read-only memory (ROM) 122 stores, for example, a boot program and fixed parameters of the image forming apparatus 100. A dynamic random access memory (DRAM) 123 is used to, for example, temporarily store data when the CPU 121 controls the image forming apparatus 100.

Hard disk drives (HDDs) 124 and 125, which are magnetic disk drives, are used to store various pieces of data, such as image data. Moreover, the reason why the HDDs 124 and 125 are provided in a two-disk configuration is that a mirroring configuration, which stores data on two HDDs so as to prevent data from being lost in the event of a failure, is employed.

A network control unit 127 controls sending and receiving of data with respect to a network 161. When receiving data addressed to the image forming apparatus 100 during the power saving mode 2, the network control unit 127 outputs a network wake signal 174.

A scanner 131 reads an original. A printer 132 prints image data on a sheet. A relay 141 performs opening and closing of contacts using electromagnetic force. Field effect transistors (FETs) 142, 143, and 144 are able to be electrically turned on and off. A diode 146 is connected to the second power supply unit 112 and the output terminal of the FET 144, and functions as a backflow prevention unit that allows electric current to flow only when the output voltage of the second power supply unit 112 is higher than the output of the FET 144. The FET 144 is provided on a power supply path leading from the first power supply unit 111 to the network control unit 127, and switches turning-on and turning-off of power supply to the network control unit 127 via the power supply path. Turning off the FET 144 enables switching a power supply source for the network control unit 127 from the first power supply unit 111 to the second power supply unit 112.

A power supply control unit 151 controls the relay 141 and the FETs 142, 143, and 144. The power supply control unit 151 is, for example, a programmable logic device (PLD), and is, for example, a complex programmable logic device (CPLD) or a field programmable gate array (FPGA). The power supply control unit 151 performs power supply control based on signals generated by internal firmware thereof. For example, the power supply control unit 151 controls the relay 141 and the FETs 142, 143, and 144 as mentioned above and controls the image forming apparatus 100 shifting to each of the above-mentioned power states. The power supply control unit 151, which is supplied with electric power even during the power saving mode, detects a plurality of types of return signals for returning from the power saving mode (for example, the power saving switch signal 172 and the network wake signal 174) and shifts the power state of the image forming apparatus 100 from the power saving mode to a normal mode. Furthermore, the power supply control unit 151 detects a power saving mode 1 shifting notification or a power saving mode 2 shifting notification output from the CPU 121 and shifts the power state of the image forming apparatus 100 from the normal mode to the power saving mode 1 or the power saving mode 2.

Next, an operation of the power supply control unit 151 is described with reference to the flowchart of FIG. 2.

Figure 2:
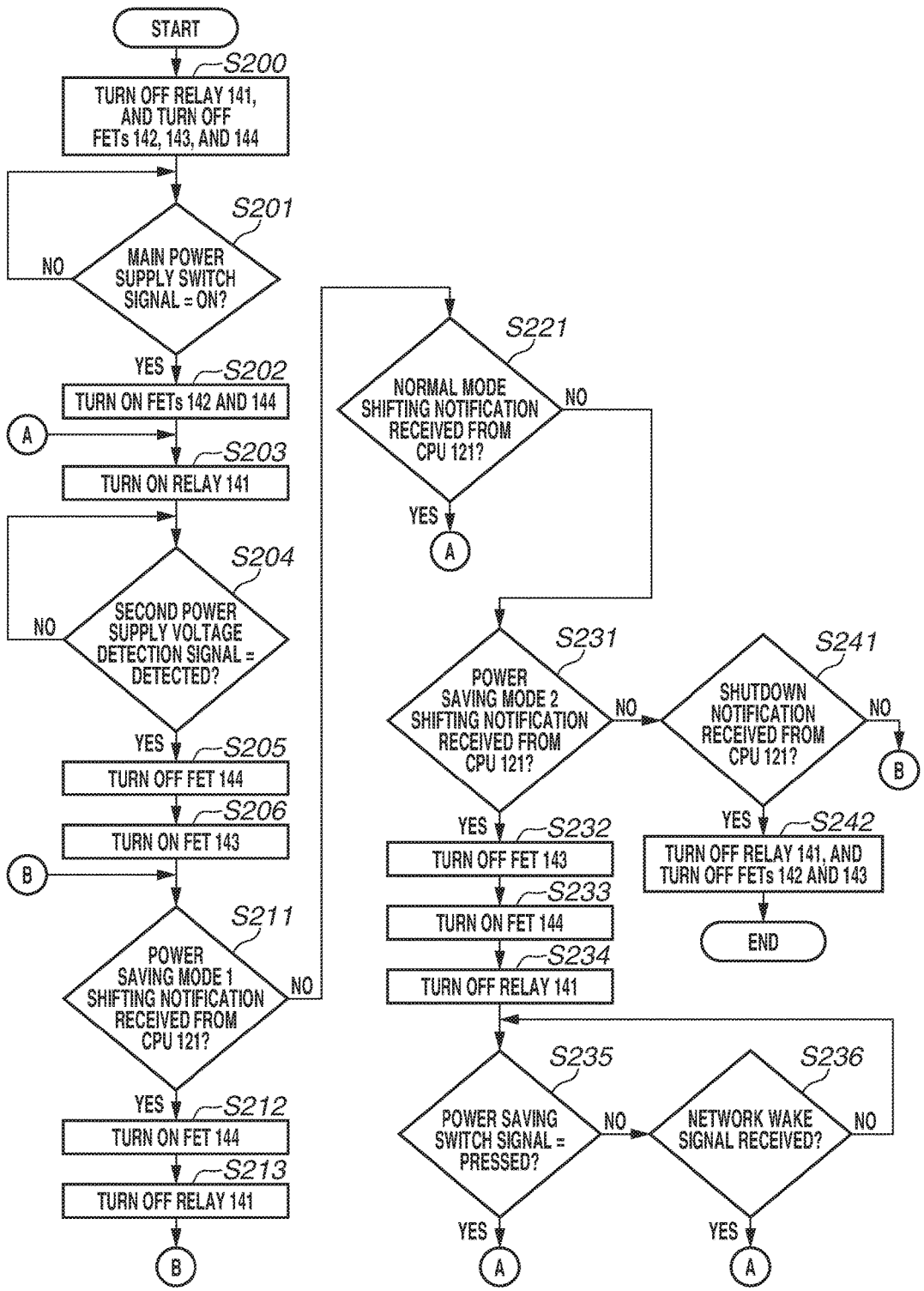
FIG. 2 is a flowchart illustrating an example of an operation of a power supply control unit in the first exemplary embodiment.

FIG. 2 is a flowchart illustrating an example of an operation of the power supply control unit 151 in the first exemplary embodiment. Each step (with S prefixed to a step number in FIG. 2) illustrated in the flowchart is implemented by the power supply control unit 151 operating based on signals generated by the internal firmware thereof.

First, when the power plug 101 is connected to the commercial power supply, AC is converted into DC by the first power supply unit 111, and the supply of power to the power supply control unit 151 is started so that the power supply control unit 151 is activated, then in step S200, the power supply control unit 151 turns off all of the relay 141 and the FETs 142, 143, and 144 as an initial state.

Then, in step S201, the power supply control unit 151 waits for the main power supply switch signal 171 to be turned on. If the power supply control unit 151 determines that the main power supply switch signal 171 has been turned on (YES in step S201), then in step S202, the power supply control unit 151 turns on the FETs 142 and 144 to start the supply of power from the first power supply unit 111 to the DRAM 123 and the network control unit 127.

Then, in step S203, the power supply control unit 151 turns on the relay 141 to supply AC to the second power supply unit 112, and the second power supply unit 112 outputs DC.

After step S203, then in step S204, the power supply control unit 151 waits for the second power supply voltage detection signal 173 to become detected. If the supply control unit 151 determines that the second power supply voltage detection signal 173 has become detected (YES in step S204), then in step S205, the power supply control unit 151 turns off the FET 144. Since, when the FET 144 is turned off, the voltage of the output of the second power supply unit 112 becomes higher than the output voltage of the FET 144, the diode 146 is energized, so that the power supply source for the network control unit 127 is switched to the output of the second power supply unit 112.

After step S205, then in step S206, the power supply control unit 151 turns on the FET 143 to perform control to start supplying power from the first power supply unit 111 to units including the CPU 121, the ROM 122, the first HDD 124, and the second HDD 125. In response to the supply of power, the CPU 121 is activated, and the image forming apparatus 100 starts operating.

After that, the power supply control unit 151 waits for various notifications from the CPU 121, including a power saving mode 1 shifting notification in step S211, a normal mode shifting notification in step S221, a power saving mode 2 shifting notification in step S231, and a shutdown notification in step S241.

If the power supply control unit 151 determines that the power saving mode 1 shifting notification has been received (YES in step S211), then step S212, the power supply control unit 151 turns on the FET 144 to start the supply of power from the first power supply unit 111 to the network control unit 127. Then, in step S213, the power supply control unit 151 turns off the relay 141 to stop supplying AC to the second power supply unit 112, thus stopping the AC-DC conversion operation. Then, the processing proceeds to step S211. At this time, the image forming apparatus 100 shifts to the power saving mode 1.

Moreover, if the power supply control unit 151 determines that the normal mode shifting notification has been received (YES in step S221), the processing proceeds to step S203. Thus, in steps S203 to S206, the power supply control unit 151 turns on the relay 141 to activate the second power supply unit 112, and then the image forming apparatus 100 returns to the normal operation mode.

Furthermore, if the power supply control unit 151 determines that the power saving mode 2 shifting notification has been received from the CPU 121 (YES in step S231), then in step S232, the power supply control unit 151 turns off the FET 143 to stop the supply of power from the first power supply unit 111 to the CPU 121, the ROM 122, the DRAM 123, the first HDD 124, and the second HDD 125. Then, in step S233, the power supply control unit 151 turns on the FET 144 to start the supply of power from the first power supply unit 111 to the network control unit 127.

Then, in step S234, the power supply control unit 151 turns off the relay 141 to stop supplying AC to the second power supply unit 112, thus stopping the AC-DC conversion operation. Thus, the image forming apparatus 100 shifts to the power saving mode 2. In the power saving mode 2, the second power supply unit 112 is in an off-state, and the supply of power from the first power supply unit 111 is performed only to the power supply control unit 151, the DRAM 123, and the network control unit 127, so that the power consumption is considerably low.

Then, the power supply control unit 151 waits for a pressed state of the power saving switch signal 172 in step S235, or reception of the network wake signal 174 in step S236. If the power supply control unit 151 determines that the power saving switch signal 172 is in the pressed state (YES in step S235) or determines that the network wake signal 174 has been received (YES in step S236), the processing returns to step S203. Thus, in steps S203 to S206, the image forming apparatus 100 returns from the power saving mode 2 to the normal mode.

Moreover, if the power supply control unit 151 determines that the shutdown notification has been received from the CPU 121 (YES in step S241), then in step S242, the power supply control unit 151 turns off the relay 141 and the FETs 142 and 143 to stop the supply of power to all of the units including the CPU 121. Thus, the image forming apparatus 100 enters an off-state.

Next, an operation of the CPU 121, which sends notifications of operation modes to the power supply control unit 151, is described with reference to the flowchart of FIG. 3.

Figure 3:
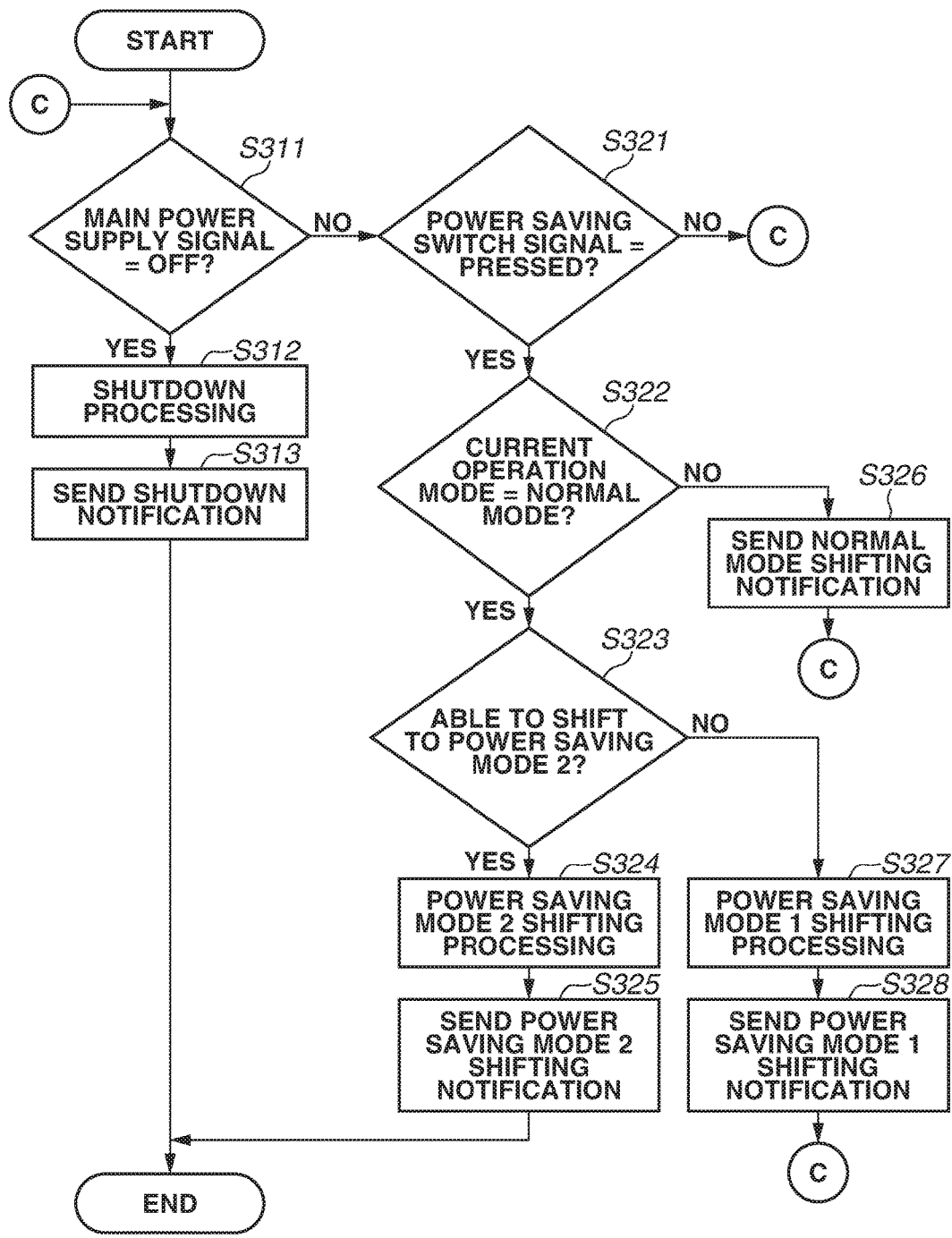
FIG. 3 is a flowchart illustrating an example of an operation of a central processing unit (CPU).

FIG. 3 is a flowchart illustrating an example of an operation of the CPU 121, which sends notifications of operation modes to the power supply control unit 151. Each step (with S prefixed to a step number in FIG. 3) illustrated in the flowchart is implemented by the CPU 121 loading a program stored in the ROM 122 or the first HDD 124 and the second HDD 125 onto the DRAM 123 and executing the program as appropriate. Furthermore, although the CPU 121 performs not only a control operation on the power supply control unit 151 but also other control operations on the other units of the image forming apparatus 100, the description of the other control operations is omitted.

When the CPU 121 is activated, the operation mode becomes the normal mode, and then, the CPU 121 waits for the main power supply switch signal 171 to enter an off-state in step S311, and waits for the power saving switch signal 172 to enter the pressed state in step S321.

If the CPU 121 determines that the main power supply switch signal 171 has entered an off-state (YES in step S311), then in step S312, the CPU 121 performs shutdown processing, and then in step S313, the CPU 121 sends a shutdown notification to the power supply control unit 151. In response to the shutdown notification, processing operations in steps S241 and S242 illustrated in FIG. 2 are performed by the power supply control unit 151, and the supply of power to the units including the CPU 121 is stopped, so that the image forming apparatus 100 is powered off and enters an off-state.

Moreover, if the CPU 121 determines that the power saving switch signal 172 has entered the pressed state (YES in step S321), then in step S322, the CPU 121 determines whether the current operation mode is the normal mode. If the CPU 121 determines that the current operation mode is the power saving mode 1 (NO in step S322), then in step S326, the CPU 121 sends a normal mode shifting notification to the power supply control unit 151. Then, the processing proceeds to step S311. In response to the normal mode shifting notification, processing operations in steps S221 and S203 to S206 illustrated in FIG. 2 are performed by the power supply control unit 151, so that the image forming apparatus 100 returns to the normal mode.

On the other hand, if the CPU 121 determines that the current operation mode is the normal mode (YES in step S322), then in step S323, the CPU 121 determines whether the image forming apparatus 100 is in a state of being able to shift to the power saving mode 2. Furthermore, a state of being unable to shift to the power saving mode 2 includes, for example, a state in which the image forming apparatus 100 is communicating with an external device via the network 161.

If the CPU 121 determines that the image forming apparatus 100 is in a state of being able to shift to the power saving mode 2 (YES in step S323), then in step S324, the CPU 121 performs power saving mode 2 shifting processing. More specifically, since, in the power saving mode 2, the CPU 121 is powered off, the CPU 121 performs, for example, save of an internal register and processing for shifting the DRAM 123 to a self-refresh mode capable of retaining data with low power consumption. Then, in step S325, the CPU 121 sends a power saving mode 2 shifting notification to the power supply control unit 151. In response to the power saving mode 2 shifting notification, processing operations in steps S231 to S234 illustrated in FIG. 2 are performed by the power supply control unit 151, and the supply of power to predetermined units including the CPU 121 is stopped, so that the image forming apparatus 100 shifts to the power saving mode 2.

On the other hand, if the CPU 121 determines that the image forming apparatus 100 is not in a state of being able to shift to the power saving mode 2 (NO in step S323), then in step S327, the CPU 121 performs power saving mode 1 shifting processing. More specifically, the CPU 121 makes preparations for powering off the scanner 131 or the printer 132. Then, in step S328, the CPU 121 sends a power saving mode 1 shifting notification to the power supply control unit 151. Then, the processing proceeds to step S311. In response to the power saving mode 1 shifting notification, processing operations in steps S211 to S213 illustrated in FIG. 2 are performed by the power supply control unit 151, so that the image forming apparatus 100 shifts to the power saving mode 1.

As described above, since, after a power supply source for the network control unit 127 is switched to the second power supply unit 112, the supply of power from the first power supply unit 111 is performed to, for example, the CPU 121, the first HDD 124, and the second HDD 125, the peak power of the first power supply unit 111 can be decreased. Therefore, two HDDs can be simultaneously started to be activated while the peak power of the first power supply unit 111 is reduced. Simultaneously starting to activate two HDDs in this way eliminates the need to wait for a spinup time of one HDD and then activate the other HDD as in a conventional technique, and, therefore, enables making the starting time of the image forming apparatus 100 shorter than in the conventional technique.

In the above-described first exemplary embodiment, an example has been described in which the activation of the CPU 121 is performed after the activation of the second power supply unit 112. A second exemplary embodiment of the present invention is configured such that the CPU 121 is able to be activated prior to the activation of the second power supply unit 112, and is directed to enabling quickening the activation of the CPU 121, which performs control over the image forming apparatus 100, and quickening the start-up of the image forming apparatus 100.

Figure 4:
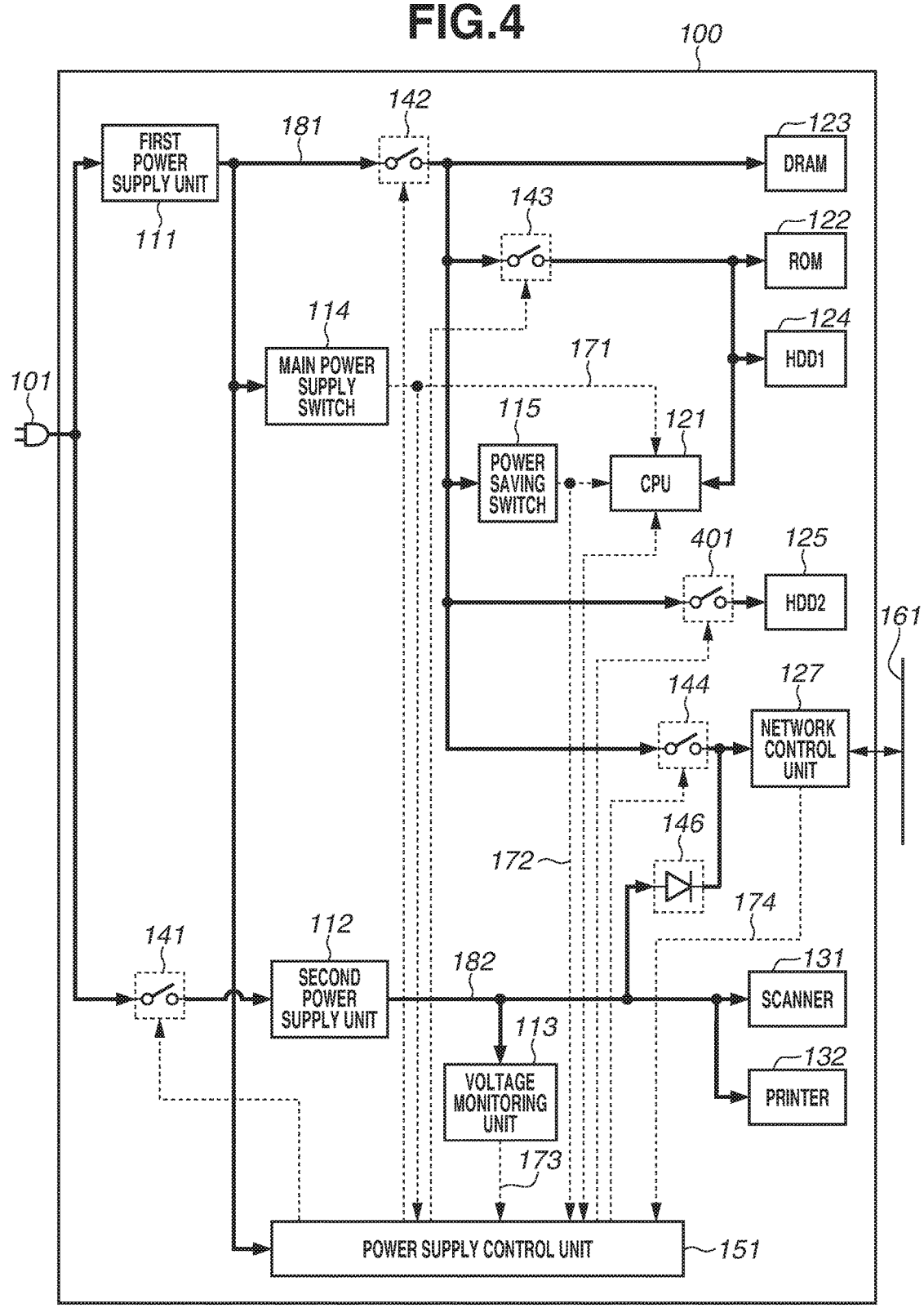
FIG. 4 is a hardware configuration diagram of an image forming apparatus to which an information processing apparatus is applicable according to a second exemplary embodiment.

FIG. 4 is a block diagram illustrating an example of a hardware configuration of an image forming apparatus 100 to which an information processing apparatus according to the second exemplary embodiment of the present invention is applicable. Furthermore, the same units or components as those illustrated in FIG. 1 are assigned the respective same reference numerals.

FIG. 4 differs from FIG. 1 used in the first exemplary embodiment only in that an FET 401 is provided on a power supply path leading to the second HDD 125, and is similar to FIG. 1 with respect to the other units or components, so that the description of FIG. 4 is omitted.

Next, an operation of the power supply control unit 151 in the second exemplary embodiment is described with reference to the flowchart of FIG. 5.

FIG. 5 is a flowchart illustrating an example of an operation of the power supply control unit 151 in the second exemplary embodiment. Each step (with S prefixed to a step number in FIG. 5) illustrated in the flowchart is implemented by the power supply control unit 151 operating based on signals generated by internal firmware thereof. Furthermore, the same steps as those illustrated in FIG. 2 are assigned the respective same step numbers, and the description thereof is omitted.

First, when the power plug 101 is connected to the commercial power supply, AC is converted into DC by the first power supply unit 111, and the supply of power to the power supply control unit 151 is started so that the power supply control unit 151 is activated, then in step S500, the power supply control unit 151 turns off all of the relay 141 and the FETs 142, 143, 144, and 401 as an initial state.

After processing in steps S201 and S202, then in step S501, the power supply control unit 151 turns on the FET 143 to start supplying power from the first power supply unit 111 to units including the CPU 121, the ROM 122, and the first HDD 124. Then, the CPU 121 is activated, and the image forming apparatus 100 starts operating.

After processing in steps S203 to S205, then in step S502, the power supply control unit 151 turns on the FET 401 to start supplying power from the first power supply unit 111 to the second HDD 125.

Then, if the power supply control unit 151 determines that the power saving mode 2 shifting notification has been received from the CPU 121 (YES in step S231), then in step S503, the power supply control unit 151 turns off the FETs 143 and 401 to stop the supply of power from the first power supply unit 111 to the units such as the CPU 121.

Moreover, if the power supply control unit 151 determines that the shutdown notification has been received from the CPU 121 (YES in step S241), then in step S504, the power supply control unit 151 turns off the relay 141 and the FETs 142, 143, and 401 to stop the supply of power to all of the units including the CPU 121. Thus, the image forming apparatus 100 enters an off-state.

Furthermore, the operation of the CPU 121 is similar to that described in the first exemplary embodiment, and, therefore, the description thereof is omitted.

As described above, the FET 401 is additionally provided to control the supply of power to the second HDD 125. With this configuration, the supply of power to the CPU 121, the ROM 122, and the first HDD 124 is performed prior to the activation of the second power supply unit 112, and, after a power supply source for the network control unit 127 is switched to the second power supply unit 112, the supply of power from the first power supply unit 111 is performed to the second HDD 125. This enables satisfying both of promptly activating the CPU 121 and reducing the peak power of the first power supply unit 111 at the time of power-on or at the time of returning from the power saving mode 2 to the normal mode. Accordingly, the activation of the CPU 121 can be made faster with the peak value reduced, and the start-up of the image forming apparatus 100 can also be made faster.

Furthermore, in the above-described exemplary embodiments, an example has been described in which a functional unit group to which power can be supplied from the first power supply unit 111 or the second power supply unit 112 includes only the network control unit 127. However, the functional unit group to which power can be supplied from the first power supply unit 111 or the second power supply unit 112 can include another functional unit. For example, an external interface, such as a universal serial bus (USB) interface, and some keys of an operation unit (the power saving switch 115) can be included in the functional unit group to which power can be supplied from the first power supply unit 111 or the second power supply unit 112. In other words, such a functional unit group can be connected to the output end of the FET 144.

Moreover, in the above-described exemplary embodiments, a configuration has been described in which the FET 144 and the diode 146 are provided and a power supply source for the network control unit 127 is switched from the first power supply unit 111 to the second power supply unit 112 by turning off the FET 144. However, another configuration using, for example, a switch can be used to change a power supply source for the network control unit 127 from the first power supply unit 111 to the second power supply unit 112.

In the above-described exemplary embodiments, an example has been described in which a relay or an FET is used to switch power-on and power-off. However, the configuration for switching power-on and power-off is not limited to this example, but can be any configuration as long as it is able to electrically control on and off.

Furthermore, in the above-described exemplary embodiments, the network control unit 127 has been described as an example of a unit for which a power supply source is switched to the second power supply unit 112 to reduce the peak power of the first power supply unit 111. However, the unit for which a power supply source is switched is not limited to the network control unit 127. For example, a power supply source for the CPU 121 or an optional device, such as a hardware accelerator, that would not be mounted in a standard configuration can be switched.

Moreover, although, in the above-described exemplary embodiments, an image forming apparatus, such as a multifunction peripheral (MFP), has been described as an example of an information processing apparatus according to an exemplary embodiment, this is not limiting. For example, aspects of the present invention can also be applied to a personal computer, a tablet computer, a server apparatus, a video recording apparatus, such as a hard disk recorder, which performs recording of video, and various types of home electrical appliance.

Additionally, the configuration and content of the above-described various pieces of data are not limiting, but can be modified or altered in various manners depending on the intended use or purpose.

While some exemplary embodiments have been described above, aspects of the present invention can be embodied, for example, as a system, an apparatus, a method, a program, and a storage medium. More specifically, aspects of the present invention can also be applied to a system composed of a plurality of devices, or can also be applied to an apparatus composed of a single device.

Furthermore, a configuration obtained by combining the above-described exemplary embodiments can also be included in the present invention.

As described above, according to an exemplary embodiment, since the power supply source for some functional units (for example, the network control unit 127) is switched from the first power supply unit 111 to the second power supply unit 112 and, after that, the supply of power from the first power supply unit 111 is performed to other functional units (for example, the CPU 121 or the HDD 124 or 125), a plurality of functional units can be promptly activated while the peak power consumption of the first power supply unit 111 is reduced. Accordingly, since a plurality of functional units can be quickly activated without an increase in the rated output capacity of a power supply unit, any delay of the starting time of an information processing apparatus can be advantageously reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-171338 filed Aug. 31, 2015, which is hereby incorporated by reference herein in its entirety.

What is claimed is:

1. An information processing apparatus comprising:
   a first power supply unit;
   a first device and a second device to which power is supplied from the first power supply unit;
   a second power supply unit;
   a third device to which power is supplied from each of the first power supply unit and the second power supply unit; and
   a power controller which performs control to switch a power supply source for the third device from the first power supply unit to the second power supply unit, and then to cause power to be supplied from the first power supply unit to the second device.

2. The information processing apparatus according to claim 1, wherein, according to detecting, in a power saving state in which the second power supply unit is turned off, a return factor for canceling the power saving state, the power controller performs control to turn on the second power supply unit, to switch the power supply source for the third device from the first power supply unit to the second power supply unit, and then to cause power to be supplied from the first power supply unit to the second device.

3. The information processing apparatus according to claim 2, wherein, according to detecting a shift factor for shifting to the power saving state, the power controller performs control to turn off the second power supply unit, to switch the power supply source for the third device from the second power supply unit to the first power supply unit, and then to stop power from being supplied from the first power supply unit to the second device.

4. The information processing apparatus according to claim 3, further comprising a first switch located between the first power supply unit and the second device,
   wherein the power controller stops power from being supplied from the first power supply unit to the second device by turning off the first switch.

5. The information processing apparatus according to claim 2, further comprising a monitoring circuit which monitors an output voltage of the second power supply unit,
   wherein, according to the monitored voltage becoming equal to or higher than a predetermined voltage, the power controller switches the power supply source for the third device from the first power supply unit to the second power supply unit.

6. The information processing apparatus according to claim 1, further comprising:
   a first switch located between the third device and the first power supply unit; and
   a diode located between the third device and the second power supply unit.

7. The information processing apparatus according to claim 6, wherein the power controller switches the power supply source for the third device from the first power supply unit to the second power supply unit by turning off the first switch.

8. The information processing apparatus according to claim 1, wherein the third device includes a network interface.

9. The information processing apparatus according to claim 8, wherein the network interface performs wireless communication with an external device.

10. The information processing apparatus according to claim 1, wherein the first device includes a dynamic random access memory (DRAM).

11. The information processing apparatus according to claim 1, wherein the second device includes a hard disk drive.

12. The information processing apparatus according to claim 1, further comprising a printing unit configured to print an image on a sheet.

13. The information processing apparatus according to claim 12, wherein the second power supply unit supplies power to a part of the printing unit.

14. The information processing apparatus according to claim 12, wherein, according to detecting, in a power saving state in which the second power supply unit is turned off, a return factor for canceling the power saving state, the power controller performs control to turn on the second power supply unit, to switch the power supply source for the third device from the first power supply unit to the second power supply unit, and then to cause power to be supplied from the first power supply unit to the second device.

15. The information processing apparatus according to claim 14, wherein, according to detecting a shift factor for shifting to the power saving state, the power controller performs control to turn off the second power supply unit, to switch the power supply source for the third device from the second power supply unit to the first power supply unit, and then to stop power from being supplied from the first power supply unit to the second device.

16. The information processing apparatus according to claim 12, further comprising:
    a first switch located between the third device and the first power supply unit; and
    a diode located between the third device and the second power supply unit.

17. The information processing apparatus according to claim 16, wherein the power controller switches the power supply source for the third device from the first power supply unit to the second power supply unit by turning off the first switch.

18. The information processing apparatus according to claim 12, wherein the third device includes a network interface.

19. The information processing apparatus according to claim 18, wherein the network interface performs wireless communication with an external device.

20. The information processing apparatus according to claim 12, wherein the first device includes a dynamic random access memory (DRAM).

* * * * *